US006584231B1

United States Patent
Wolinsky et al.

(10) Patent No.: US 6,584,231 B1
(45) Date of Patent: Jun. 24, 2003

(54) SYSTEM AND METHOD FOR SELECTIVE GRAYSCALE COMPRESSION FOR DEFECT IMAGES

(75) Inventors: Jeffrey Wolinsky, Berkeley, CA (US); Sherrill Lavagnino, Oakland, CA (US)

(73) Assignee: Cognex Technology and Investment Corporation, Natick, MA (US)

( * ) Notice: Subject to any disclaimer, the term of this patent is extended or adjusted under 35 U.S.C. 154(b) by 75 days.

(21) Appl. No.: 09/842,949

(22) Filed: Apr. 27, 2001

Related U.S. Application Data

(63) Continuation of application No. 09/750,187, filed on Dec. 29, 2000, now abandoned.
(51) Int. Cl.[7] .............................. G06K 9/36; G06K 9/46
(52) U.S. Cl. ...................................... 382/245; 382/243
(58) Field of Search ................................ 382/245, 243, 382/173, 183, 194, 141; 358/426.13, 464

(56) References Cited

U.S. PATENT DOCUMENTS 6,301,300 B1 * 10/2001 Matsushiro .................. 382/245
6,307,964 B1 * 10/2001 Lin et al. ..................... 382/243
6,353,684 B1 * 3/2002 Yamaguchi et al. ......... 382/243

* cited by examiner

Primary Examiner—Phuoc Tran

(57) ABSTRACT

A system and method is provided for compressing a grayscale pixel image of an object against a background. Processed data, including pixel intensity data, corresponding to an image, is received, and the pixels of the image are categorized as background or object pixels. The pixel intensity values of the image are run-length encoded, which includes background encoding to produce runs of background pixels, and object encoding to generate runs of pixels falling within respective ranges. Each range of the object-encoded runs is defined as a function of the intensity value of the first pixel of a given run. A maximum run-length of background pixel runs, and maximum run-length for object pixel runs is provided. The background and object pixel runs are stored as a compressed image.

16 Claims, 6 Drawing Sheets

SYSTEM AND METHOD FOR SELECTIVE GRAYSCALE COMPRESSION FOR DEFECT IMAGES

This is a continuation of National application Ser. No. 09/750,187 filed Dec. 29, 2000 now abandoned.

BACKGROUND OF THE INVENTION

1. Copyright Notice

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

2. Field of the Invention

Aspects of the present invention generally relate to the field of machine vision manufacturing and inspection. More particularly, aspects of the present invention relate to a system and method for compressing grayscale pixel images of defects in manufactured products in a machine vision system.

3. Description of Background Information

The speed at which a visual inspection system, such as a machine vision system, can perform an inspection task is highly dependent on the complexity of the image data that must be processed, and the number of image features that must be extracted from the image data for comparison purposes in order to achieve a reliable decision on whether the product under inspection should be accepted or rejected. Image compression is used to reduce the a mount of space needed to store and time to transmit an image. Typically, the greater the amount of compression of an image, the greater the divergence between the original image and the image that would be restructured from the compressed data.

Compression of images is commonly achieved by various techniques of run-length encoding (RLE), in which adjacent pixels with identical or similar intensity values are represented by a single intensity value, and a count of the number of pixels within the run. The strings of identical bits are stored in a memory as a code to reduce the number of bits in memory.

There is a need for an efficient and effective data compression technique of image data associated with systems for inspecting, while retaining sufficient information about objects or defects in the image to enable a human viewer to identify the object's characteristics.

SUMMARY OF THE INVENTION

The present invention, in one aspect, provides a system and method for compressing a grayscale image of an object against a background. In the illustrated embodiment, a lossy compression technique may be employed in a machine vision system. The distinction between object and background pixels is used to selectively and significantly compress image data, while retaining sufficient information about an object in the image to enable a human viewer to identify characteristics of the object. A maximum number of pixels for a run length for a pixel grouping is provided based upon whether the pixels are background or object pixels. Each compressed image is composed of fixed information, which includes a count of the initial background pixels and a count of the total number of encoded runs, and a variable number of encoded runs. The encoded runs include background encoding to produce background pixel runs, and object encoding to produce separate runs of object pixels. The object encoding generates runs of pixels that fall within respective ranges, and each run is defined as a function of the intensity value of the first pixel of a given run. The object and background runs are stored in a predetermined bit pattern as a compressed image.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 3 illustrates exemplary image data in which background and object pixels of an image are depicted;

FIG. 4 illustrates exemplary encoded run bytes generated by the compression technique of the illustrate embodiment;

DETAILED DESCRIPTION

Figure 1A:
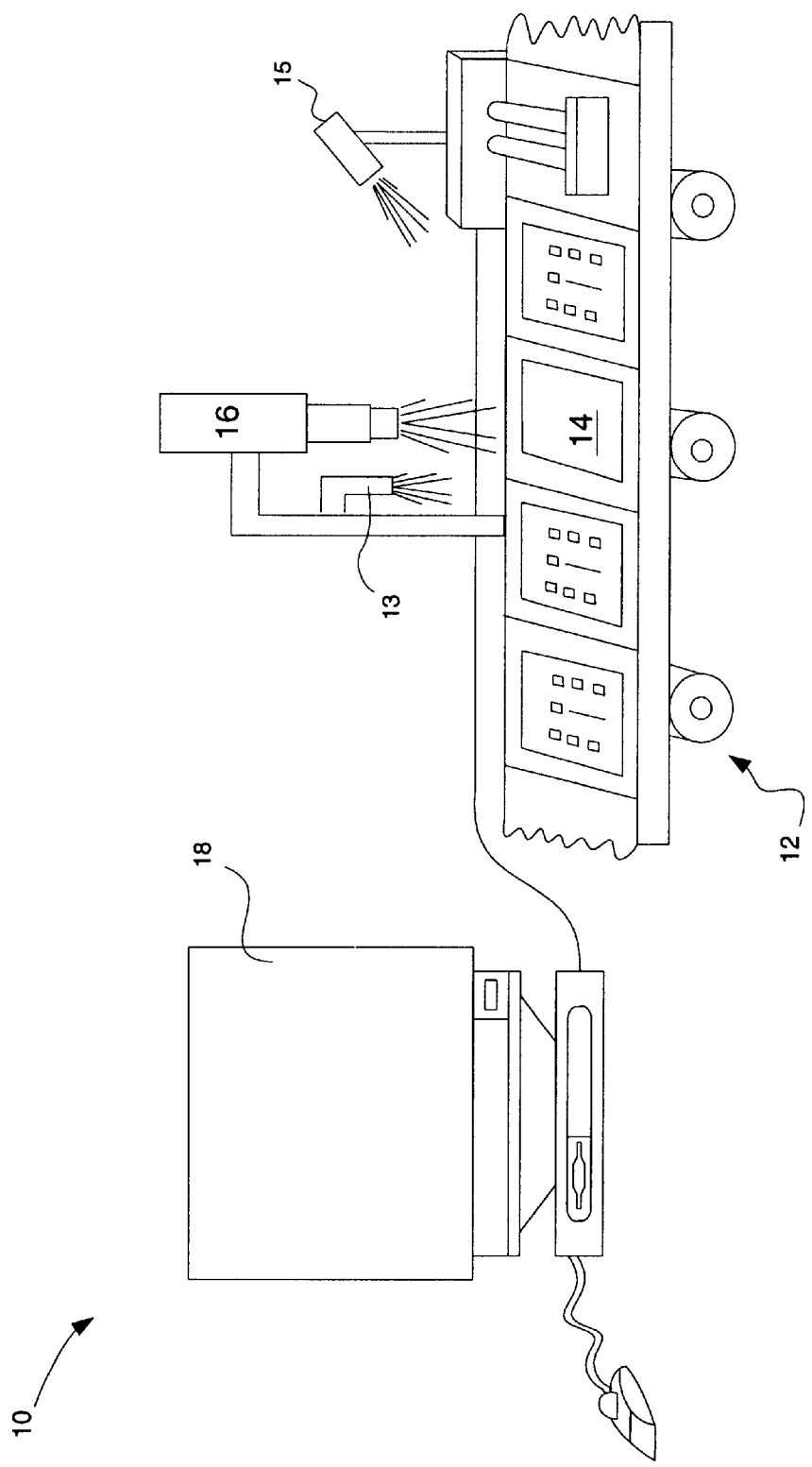
FIG. 1(a) illustrates a vision inspection system in which an embodiment of the present invention may be incorporated.
Figure 1:
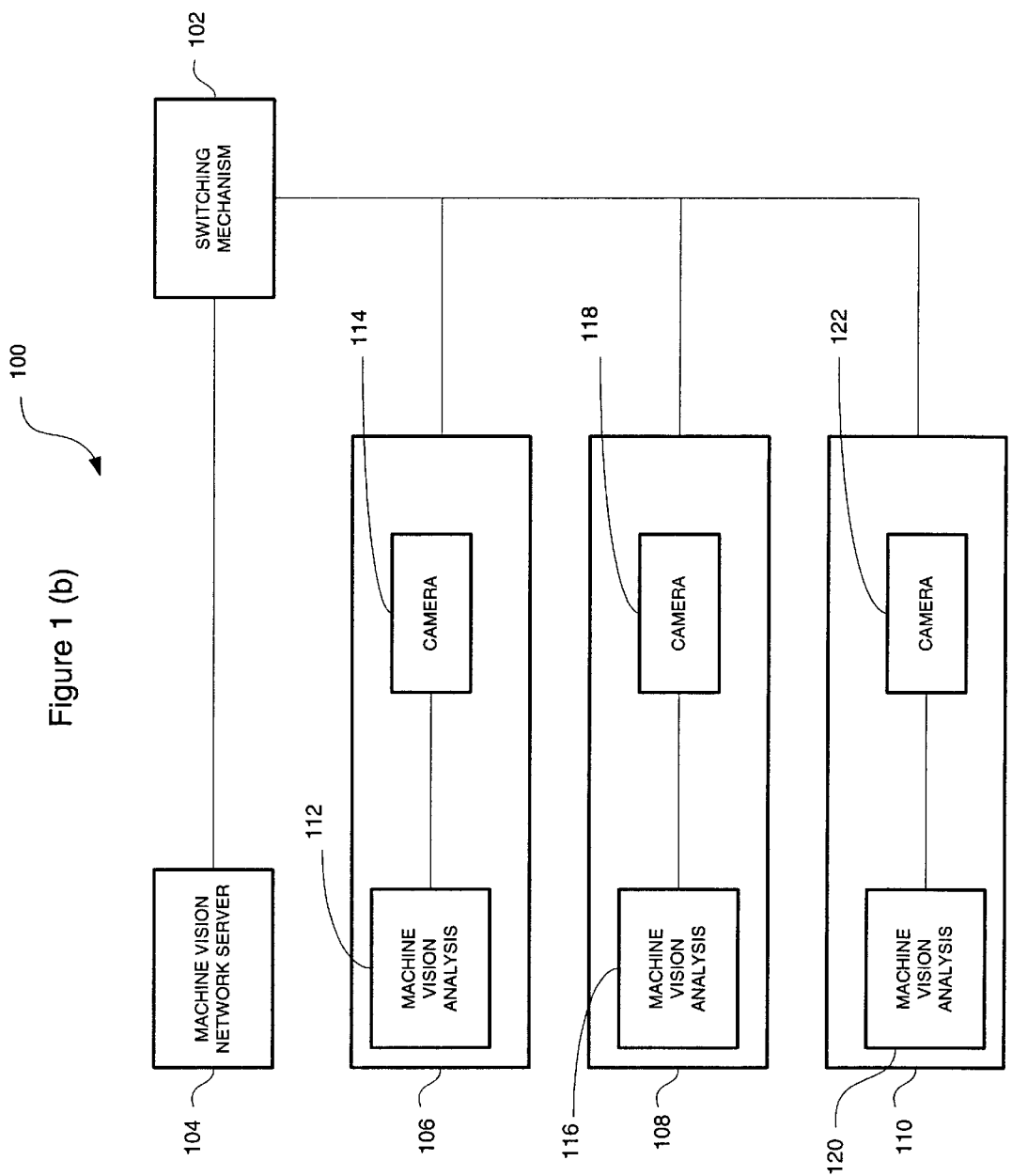
FIG. 1(b) illustrates an imaging camera network in which an embodiment of the present invention may be incorporated.

FIG. 1(a) illustrates a vision inspection system 10, such as a machine vision system, in which the compression technique of the present invention may be incorporated. Vision inspection system 10 may be employed for a manufacturing line such as manufacturing line 12, as shown in FIG. 1. Using the vision inspection system 10, sample objects 14, for example decorative tiles, can be inspected for compliance with metrics such as shape or design. Vision inspection system 10 may be a frame-based or a continuous process type of inspection such as web-based inspection in which, for example, a continuous spool of material may be inspected.

Image(s) of the sample objects 14 illuminated by a first and a second light source 13, 15 respectively, are obtained by an imaging device or camera 16. The first light source 13 may be, for example, an on-axis light source and a second light source 15 may be, for example, an off-axis light source. It may be preferable for the on-axis light source 13 to be positioned substantially perpendicular to the sample objects 14, otherwise normal to the sample object 14 under inspection (i.e., same vantage point as the camera) so that most of the on-axis illumination is reflected back into the camera 16.

The camera 16 may be, for example, an analog or digital CCD camera, coupled to the vision inspection system 10 for conversion by the vision system to a digital representation of image data, e.g., a pixel representation, corresponding to the decorative tile image. The vision inspection system 10 can include a display monitor 18 or other equipment for displaying the obtained sample-object image to a manufacturing line operator for manual inspection of the sample-object 14. After determining the inspection data of the sample-object 14 under inspection, the machine vision system can provide information about the sample-object's position, geometry, size, or other characteristics. The sample object image on display monitor 18 may be compressed and stored in a memory and accessed to provide further characteristic information pertaining to the sample object 14.

FIG. 1(b) illustrates an imaging camera network (ICN) 100. In the ICN of FIG. 1(b), multiple vision systems for controlling vision inspection processing in which image acquisition and analysis may be conducted concurrently are tied together via a network. The networked vision systems may correspond to various inspection systems that are distributed throughout a manufacturing line, for example as shown in FIG. 1(a), or process applications of a network such as remote process monitoring and reporting.

In FIG. 1(b), via a switching mechanism 102, which may include a local area network (LAN) or wide area network (WAN), for example the Internet, a point to point connection is established between a machine vision network server 104 and multiple machine vision stations 106, 108 and 110. Each machine vision station, for example machine station 106, includes a machine vision analysis portion 112 and a camera 114.

ICN 100 functions to easily permit a system on the network to directly share data with another system on the network, and thus provide system to system communication capability. For example, camera 114 of machine vision station 106 may verify and analyze an image, and send or link the results of the first station 106 to machine vision station 108 and machine vision station 110 or any combination thereof. The image data that is transferred between the multiple machine vision stations is compressed, using a compression technique of the present invention, before being sent to reduce the amount of space needed to store the image and to decrease the time required to transmit the image across the network. In the ICN 100, the compressed image data and information is transferred across the network to allow real time access to vision data without impacting the high speed vision task being performed at each machine vision station 106, 108 or 110. In particular, a plant manager would be able to monitor the data, images, jobs, etc during run time without impacting the performance of the vision application running on at a particular machine vision station.

Each data point in a grayscale image is represented by, e.g., an 8-bit numeric value called a pixel. The values of the pixels represent the relative intensities of the pixels, so that a pixel value of 0 represents a dark (black) pixel, and a pixel value of 255 represents a bright (white) pixel. The overall appearance of an object can be adequately represented by an image that uses fewer than 256 values representing the intensity levels from black to white. In the illustrated embodiment, for example, 32 gray intensity values are used, rather than 256. This reduces the number of bits required to store each intensity value, and allows a storage of both representative intensity and run length count information with a single 8-bit byte. Although an 8-bit numeric value is used in the illustrated embodiment, the numeric value of pixels could be represented by more or a fewer number of bits.

Figure 2:
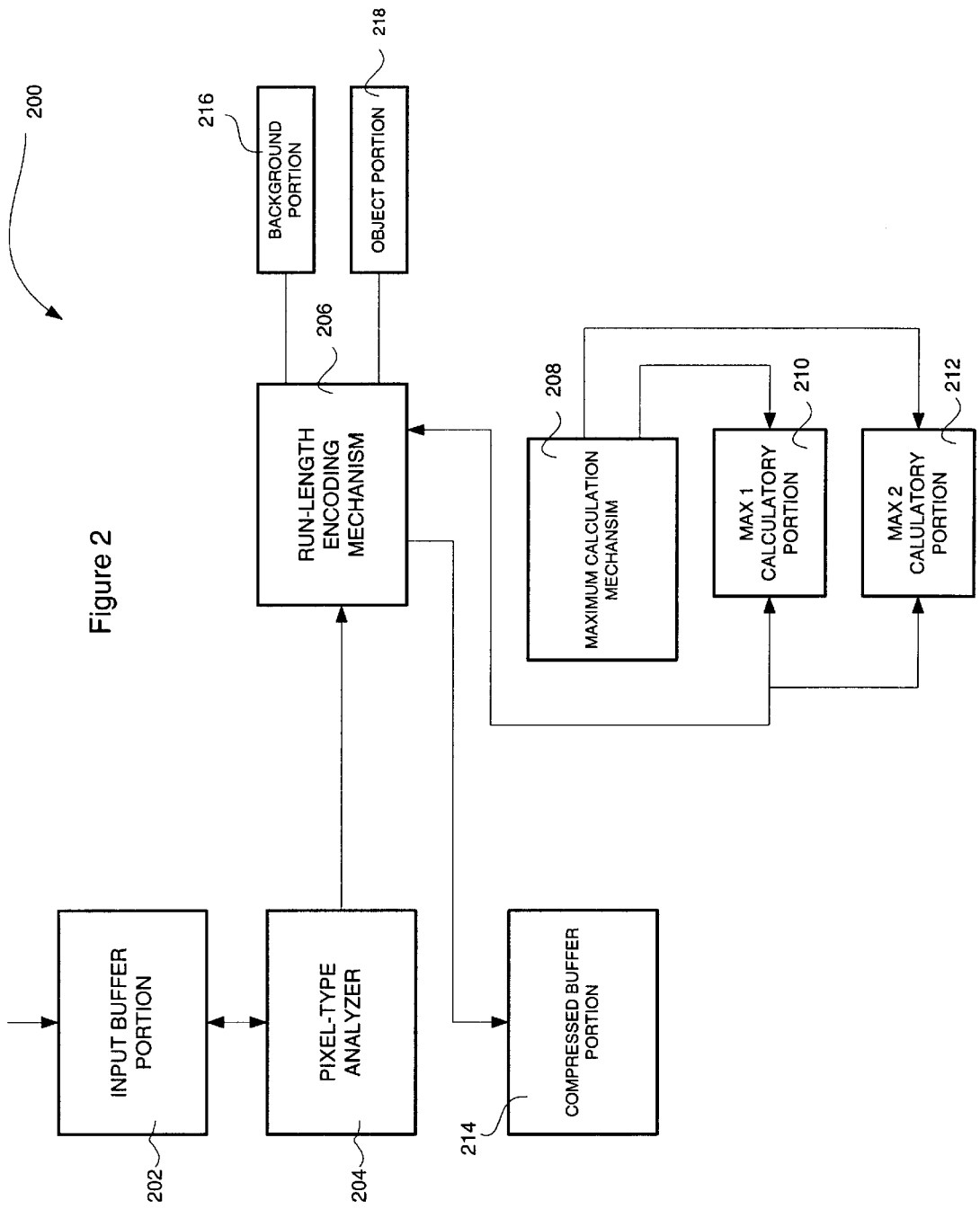
FIG. 2 illustrates a system of compressing an image in an embodiment of the present invention.
Figure 5:
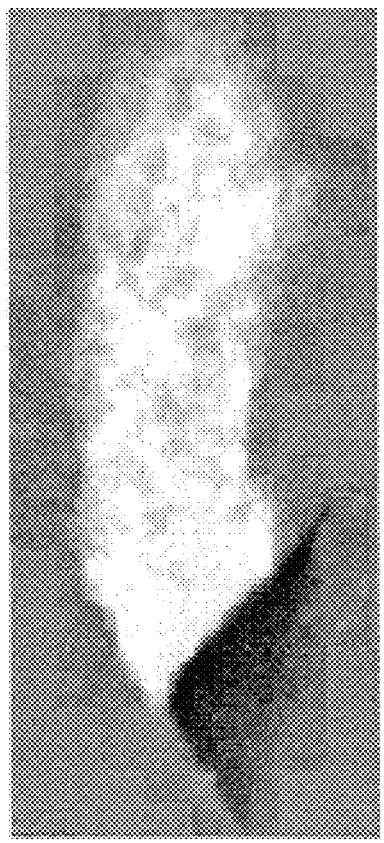
FIG. 5(a) illustrates an exemplary object as a full resolution grayscale image.
FIG. 5(b) illustrates an exemplary compressed grayscale image of the object as shown in FIG. 5(a)
Figure 5:
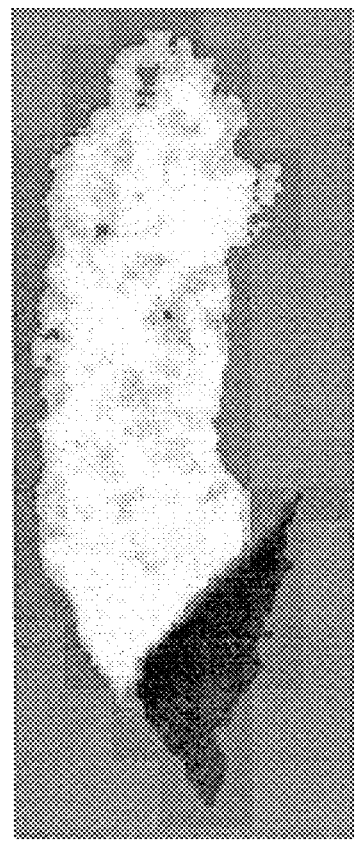

FIG. 2 illustrates a system 200 of compressing an image in an embodiment of the present invention. Processed data that includes pixel intensity corresponding to an image is received at input buffer portion 202. The processed data may also include other information related to the image such as array dimensions of the image. The pixels of an image are analyzed at 204 to determine whether the pixel is a background or object pixel. A run-length encoding mechanism 206 is used to run-length encode the pixel intensity values of the image.

The run-length encoding mechanism 206 includes, for example, a portion for background encoding 216 to produce runs of background pixels, and a portion for object encoding 218 to produce object runs that are separate from the background runs. The object encoding includes generating runs of pixels that fall within a respective range. The range is defined as a function of the intensity value of the first pixel of a given run, and the choice of a range depends on the needs of the specific application that is being used within the vision inspection system. In other words, the choice of a smaller range of values would produce a more detailed image, but would provide less compression. While the choice of a larger range of values would result in a higher compression but provide a less detailed image.

A maximum calculation mechanism 208 calculates a maximum run-length for background pixel runs 210 and a maximum run-length for object pixel runs 212. The encoded background and object pixel runs may be stored as compressed image data at compressed buffer portion 214.

The format of the data stored at compressed buffer portion 214 uses a predetermined bit pattern. Each encoded run is a 1-byte (8-bit) value, and in the illustrated embodiment, for example, a 5÷3 bit pattern may be selected in which 5 represents the upper order bits of encoded data, and 3 represents the lower order bits of encoded data. Any combination of bit patterns having a sum of 8-bits may be used for the predetermined bit pattern. For example, a 7÷1 or 1÷7 bit pattern could be used. The selection of this bit pattern would use runs of exactly one (1) pixel for each image pixel, which would allow for 7 bits of gray level for image pixels, for example 128 gray intensity levels.

With respect to the 5–3 bit pattern of the present embodiment, in the object pixels the lower order 3 bits are used for the run length, and the upper order 5 bits are used for the intensity level. This allows 1 to 7 pixels per run. If a run of qualifying object pixels is longer than 7 pixels, then 7 pixels are encoded in one byte and a new encoding run byte is started. In the background pixels, the lower order 3 bits are set to zero, and the upper order 5 bits are used to encode the length of the run. This allows values of 1 to 31 for the run length of a background pixel. No gray value is stored for runs of background pixels. If a run of background pixels is longer than 31 pixels, then 31 pixels are encoded in one byte and a new encoding run byte is started.

Figures 3, 4:
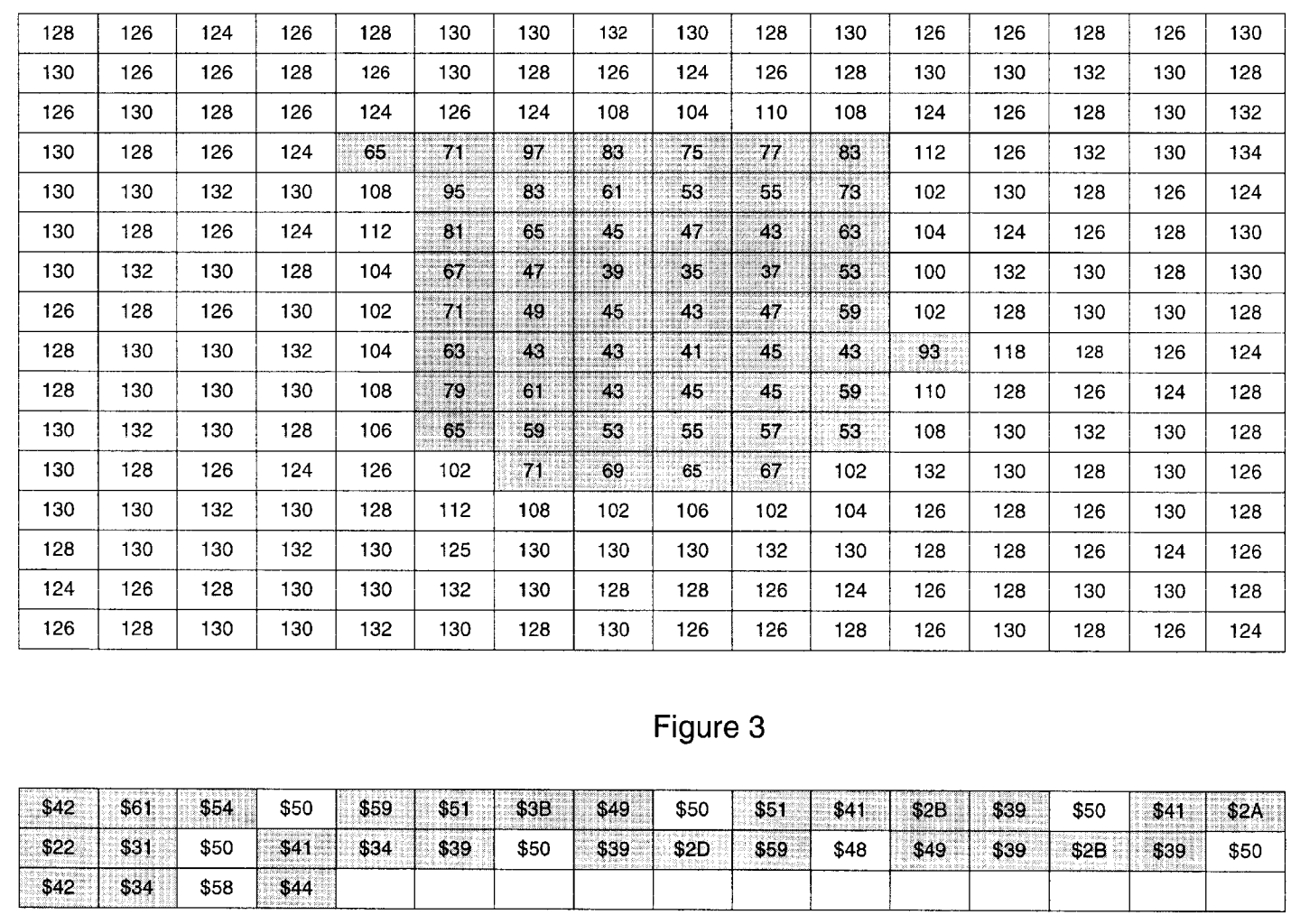

FIG. 3 illustrates exemplary image data in which background and object pixels of a 16×16 image are depicted. In FIG. 3, the lowest bit of the grayscale resolution for each pixel is used to flag an object pixel. In particular, the lowest bit has a value of zero if the pixel is a background pixel, and the lowest bit has a value of one of the pixel is an object pixel. Therefore, in FIG. 3, the background pixels are illustrated with even number values because their lowest bit has not been set to a value of one. The object pixels of the image data are depicted as shaded, odd-numbers.

In FIG. 3, image portion (1,1) has an even value of 128, and is therefore, a background pixel. As such, the initial run begins with a value of 128. The background pixels are continually counted until an object pixel is reached. Using the sample data of FIG. 3, this places the initial background count at 52. The first object pixel has a value of 65. In the present embodiment, an eight-bit gray level range is selected. Therefore, the range of pixel values included within the encoded run with the 65 gray level value are object pixels having a value between 57 and 73, i.e. (65−8) and (65÷8). The pixel adjacent to 65 has a value of 71, which is less than 73. Therefore, the first run length is two with a gray level of 65. The encoded gray level may also include the average of the gray levels for all pixels in the run or the gray level of another pixel in the run besides the initial pixel, for example, the center pixel of the run.

The next object pixel to analyze has a gray value of 97. The run for this gray value includes object pixels that fall within the range of 89–105. This results in a run length of one because the very next pixel has a gray value of 83, which is too low for the range of this particular run.

The next object pixel to analyze has a value of 83. The range for this encoded run is 75–91. The resulting run length is four with a gray value of 83.

The next pixel to analyze is a background pixel having a value 112. The run length of the background pixels is 10, which is well within a maximum run length of 31 pixels for a background pixel. Note that a run of either background or object pixels can span multiple line scans from the original image. Because the compression technique can be applied by traversing the image in a linear fashion and performing simple counting and comparison operations, the compression technique of the present invention is very computationally efficient.

The decompression process is similarly efficient. The original width and height of the image must be known for decompression, and may be input as part of the processed data that could also include pixel dimension information. This information can be stored with the compressed image or in another location. Other information may be included with the image data, such as the location of the image within the coordinate system in use, the pixel dimensions, the grayscale value to be used for background pixels (if desired) and other information needed for displaying or processing the image.

FIG. 4 illustrates exemplary encoded run bytes of FIG. 3 generated by the compression technique of an embodiment of the present invention. The encoded run byte values are represented in hexadecimal form, as indicated by the preceding "S" symbol. In FIG. 4: S42 corresponds to the first object pixel run length 2 and gray value 65 from FIG. 3; S61 corresponds to the next run length 1, the gray value 97; S54 corresponds to object pixel run length 4, gray value 83; and S50 corresponds to background pixel run 10 (no gray value is encoded for background pixels). The encoded run bytes of FIG. 4 continue to correspond for each encoded run of FIG. 3 and in total represent the compressed image data for FIG. 3.

As an optimization feature of the present embodiment, the initial background count of 52 is discarded and not included as part of the encoded run data of FIG. 4. Further, no encoding is performed of for the trailing run, which includes, for example in FIGS. 3 and 4, the background pixels following the last encoded object run length 4, gray value 71 (S44). The trailing run may be discarded to optimize memory space and increase transmittal speed of the image data. Both the initial and trailing runs of background pixels, or any combination thereof, may be encoded as part of the compressed image data.

If the trailing run of background pixels is discarded, the last encoded run of the compressed image is always an object run. All remaining pixels in the image are assumed to be background pixels. The count of trailing background pixels can be determined from the dimensions of the uncompressed image. However, for the purpose of efficient processing, it may be useful to pad a compressed image with additional bytes of data. For example, it is possible to adjust the encoding to allow the compressed data to coordinate with, for example, a native buffer size, or so that the total number of bytes in the image is a multiple of four. In the example of the present embodiment, pad bytes may be added to the end of FIG. 4, as desired. An encoded run byte value of zero is used to indicate a pad byte. If used, the pad bytes may be included in the total count of encoded runs, as desired.

Figure 6:
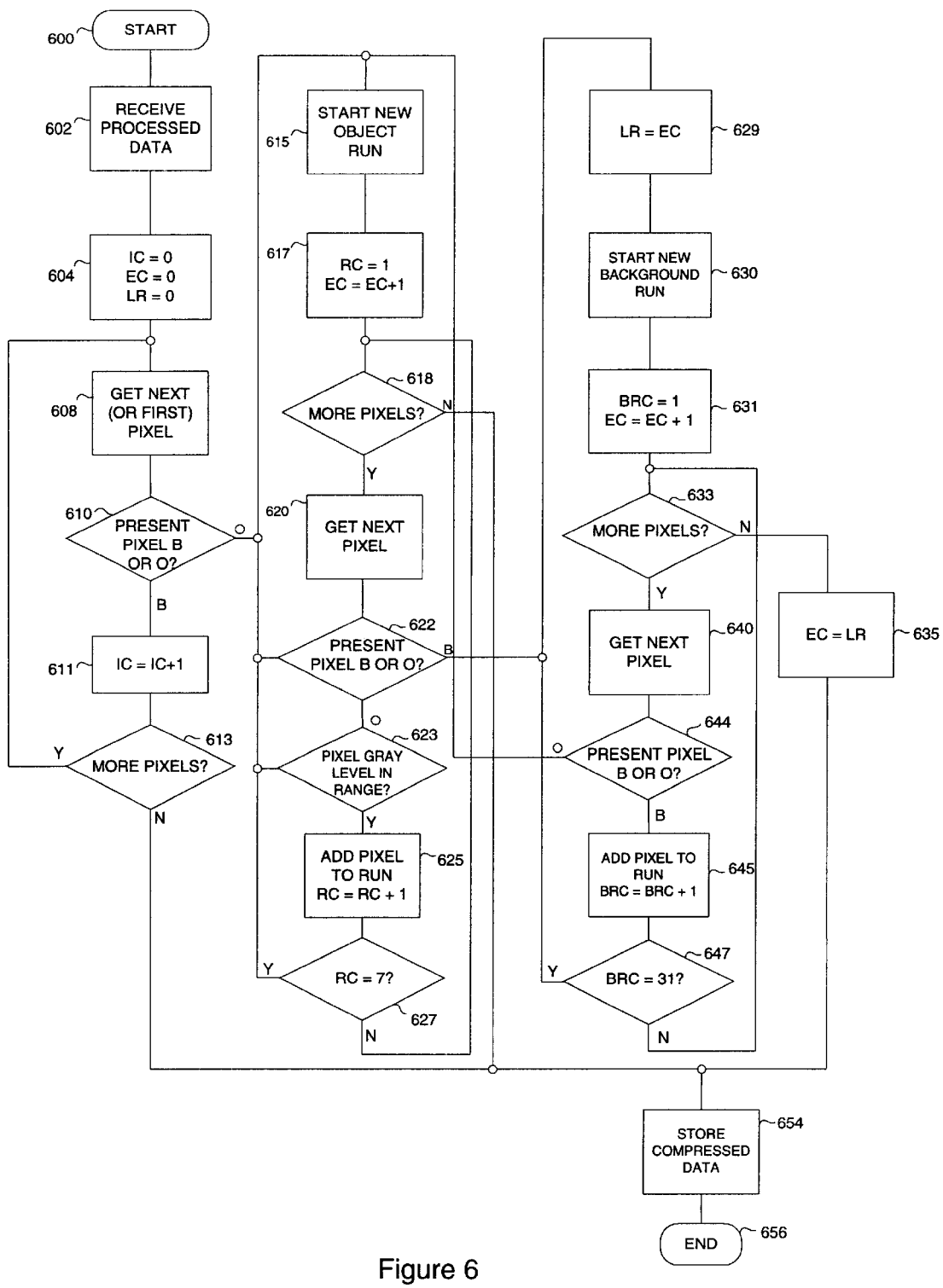
FIG. 6 is a flow diagram explaining the process of applying the selective compression technique of the illustrated embodiment.

FIG. 6 is a flow diagram that explains the process of applying the selective compression technique of the present invention. The process begins at 600 and control proceeds to 602 in which processed data that includes pixel intensity data corresponding to an image is received. At 604 a counter is initialized for LR, IC and EC values. LR represents the run number of the last encoded object run, IC represents the count of initial background pixels, while EC represents the encoded run count. At 608, the first (or next) pixel is retrieved from the source image. Control proceeds to 610. At 610, it is determined whether the present pixel is a background or object pixel. If the present pixel is a background pixel, the control proceeds to 611. At 611, IC (initial background count) is incremented, then control proceeds to 613 where it is determined whether there is another pixel in the image. If there are not further pixels in the image, control proceeds to 654. If there are further pixels in the image, control proceeds to 608.

If, at 610, the present pixel is an object pixel, control proceeds to 615, where a new run of object pixels is started by saving the gray value of, for example, the present pixel as the run's gray value, and determining the grayscale range limits for the run. At 617, the run count for the new run, RC, is initialized to 1, and the encoded run count, EC is incremented by 1. Control then passes to 618 in which it is determined whether there is another pixel in the image. If there are further pixels in the image, then control proceeds to 620. If there are no further pixels in the image, control proceeds to 654.

At 620, the next pixel is retrieved from the source image for analysis. Control proceeds to 622 where it is determined whether the pixel is a background or object pixel. If the pixel is an object pixel, control proceeds to 623, where its grayscale value is compared with the gray range limits of the current object run. If the pixel's gray level fails to fall within the range, control proceeds to 615. If the pixel's gray level does fall within the range, control proceeds to 625, in which the pixel is added to the current run by incrementing RC, the run count. Control then proceeds to 627, where RC is compared to, for example, a maximum run length value of 7. If RC is equal to 7, this encoded run is complete, and control proceeds to 615. If RC is less than 7 then control proceeds to 618.

At 622, if the present pixel is a background pixel then control proceeds to 629. At 629, the last run variable, LR, is set equal to EC, the current encoded run count. Control then proceeds to 630 where a new background run is started. Control proceeds to 631 where BRC, the run count for the background run, is set to 1, and the encoded run count, EC is incremented by 1. Control then proceeds to 633 where it is determined whether there are more pixels in the image, if not, control passes to 635. At 635, the encoded run count, EC, is set to the value of LR. Control then passes to 654.

At 633, if there are more pixels in the image, control passes to 640 where the next pixel is retrieved for analysis.

Control then passes to 644, where it is determined whether the present pixel is a background pixel or an object pixel. If it is an object pixel, control passes to 615. If it is a background pixel, control passes to 645, at which the pixel is added to the current background run by incrementing BRC by 1. Control then passes to 647 where BRC is compared to, for example, a maximum run length value of 31. If BRC is equal to 31, then this run of background pixels is complete and control passes to 629. If BRC is less than 31 then control passes to 633.

At 654, the encoded run information and data are stored as compressed image data. Control passes to 656. At 656, the process ends.

The processing performed by compressing grayscale pixel images of an object against a background in manufactured products may be performed by a general purpose computer alone or in connection with a specialized image processing computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

The present invention may be implemented by hardware or by a combination of hardware and software. The software may be recorded on a medium and executed by a computer. The medium may be, but is not limited to, for example, a floppy disk, a CD ROM, a writable CD, a Read-Only-Memory (ROM), or an Electrically Erasable Programmable Read Only Memory (EEPROM).

While the invention has been described with reference to certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not limited to the particulars disclosed, but rather extends to all equivalent structures, acts, and materials, such as are within the scope of the appended claims.

What is claimed is:

1. A method of compressing a grayscale pixel image of an object against a background, comprising:
   receiving processed pixel intensity data corresponding to an image;
   categorizing the pixels of the image as background or object pixels;
   run-length encoding the pixel intensity values of the image, said run-length encoding comprising background encoding to produce runs of background pixels and object encoding to produce separate runs of object pixels, the object encoding comprising generating runs of pixels falling within respective ranges, each range being defined as a function of the intensity value of the first pixel of a given run;
   providing a maximum run-length for background pixel runs and a maximum run-length for object pixel runs; and
   storing the background and object pixel runs in a predetermined bit pattern as a compressed image.

2. The method of claim 1, wherein the maximum run-length of a background pixel is 31 pixels.

3. The method of claim 1, wherein the maximum run-length of an object pixel is 7 pixels.

4. The method of claim 1, wherein the predetermined bit pattern comprises an upper order and a lower order of bits.

5. The method of claim 4, wherein the upper order is 5 bits and the lower order is 3 bits.

6. The method of claim 1, wherein the compressed image comprise fixed information and variable information.

7. The method of claim 6, wherein said fixed information includes:
   a count of the initial background pixels; and
   a count of the total number of encoded runs.

8. The method of claim 7, wherein said initial background pixels include the number of background pixels starting from the first pixel in the image to the last pixel preceding an object pixel.

9. The method of claim 1, further comprising discarding the initial run of background pixels when the background pixels precede an object pixel.

10. The method of claim 1, further comprising discarding the trailing run of background pixels after the last object pixel run has been encoded.

11. A system, comprising:
   an input buffer portion to receive processed data corresponding to an image, said processed data including pixel intensity data;
   a pixel type analyzer to categorize pixels of an image as a background or an object pixel, said pixel type analyzer being connected to the input buffer portion;
   a run length encoding mechanism to encode a pixel intensity value of the image, said run length encoding mechanism comprising a background encoding portion to produce runs of background pixels, and an object encoding portion to produce separate runs of object pixels, the object encoding portion generates runs of pixels falling within respective ranges, each range being defined as a function of the intensity value of the first pixel of a given run;
   a maximum calculation mechanism to calculate a maximum run length for background pixel runs and a maximum run length for object pixel runs, said maximum calculation mechanism being connected to a max1 calculating portion to determine the maximum run length for background pixel rungs, and a max2 calculating portion to determine the maximum run length for object pixel runs; and
   a compressed buffer portion to store the background and object encoded pixel runs from said run length encoding mechanism in predetermined bit pattern.

12. The system of claim 11, wherein the maximum run length of a background pixel is 31 pixels.

13. The system of claim 11, wherein the maximum run length of an object pixel is 7 pixels.

14. The method of claim 11, wherein the predetermined comprises an upper level and a lower level of bits.

15. The method of claim 14, wherein the upper level is 5 bits and the lower level is 3 bits.

16. A vision inspection system for compressing grayscale images of defects in manufactured products, the system comprising:

a machine vision system coupled to a camera, the machine vision system including:
a display that displays the image data;
a processor coupled to the display via a bus;
a memory buffer coupled to the display and the processor, via the bus, said memory buffer configured to store instruction data for said processor and compressed image data;
a controller coupled to and controlling cooperation of the display, the processor, the memory buffer and the user interface, via the bus, wherein, under the direction of the controller, the processor fetches instructions form the memory buffer that direct the controller to receive processed pixel intensity data corresponding to an image, categorize the pixels of the image as background of object pixels, run-length encode the pixel intensity values of the image, said run-length encoding comprising background encoding to produce runs of background pixels, and object encoding to produce separate runs of object pixels, the object encoding comprising generating runs of pixels falling within respective ranges, each range being defined as a function of the intensity value of the first pixel of a given run, provide a maximum run-length for background pixel runs and a maximum run-length for object pixel runs, and store the background and object pixel runs as a compressed image at the memory buffer.

* * * * *